No. 676,656. Patented June 18, 1901.
A. HAAS.
LIQUID MEASURING MECHANISM.
(Application filed Jan. 14, 1901.)
(No Model.) 3 Sheets—Sheet 1.
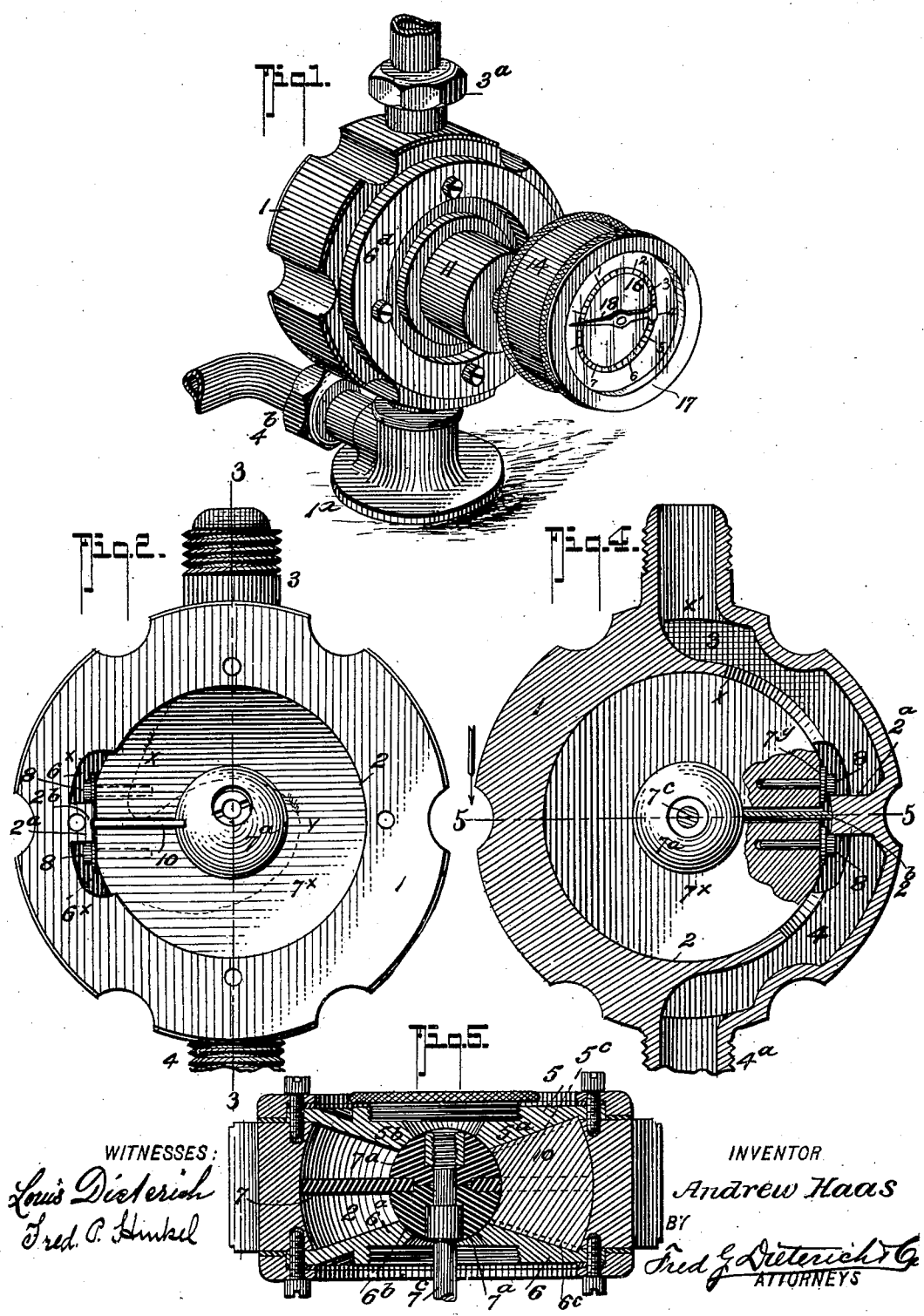
WITNESSES:
Louis Dieterich
Fred C. Hinkel
INVENTOR
Andrew Haas
BY
Fred G. Dieterich
ATTORNEYS

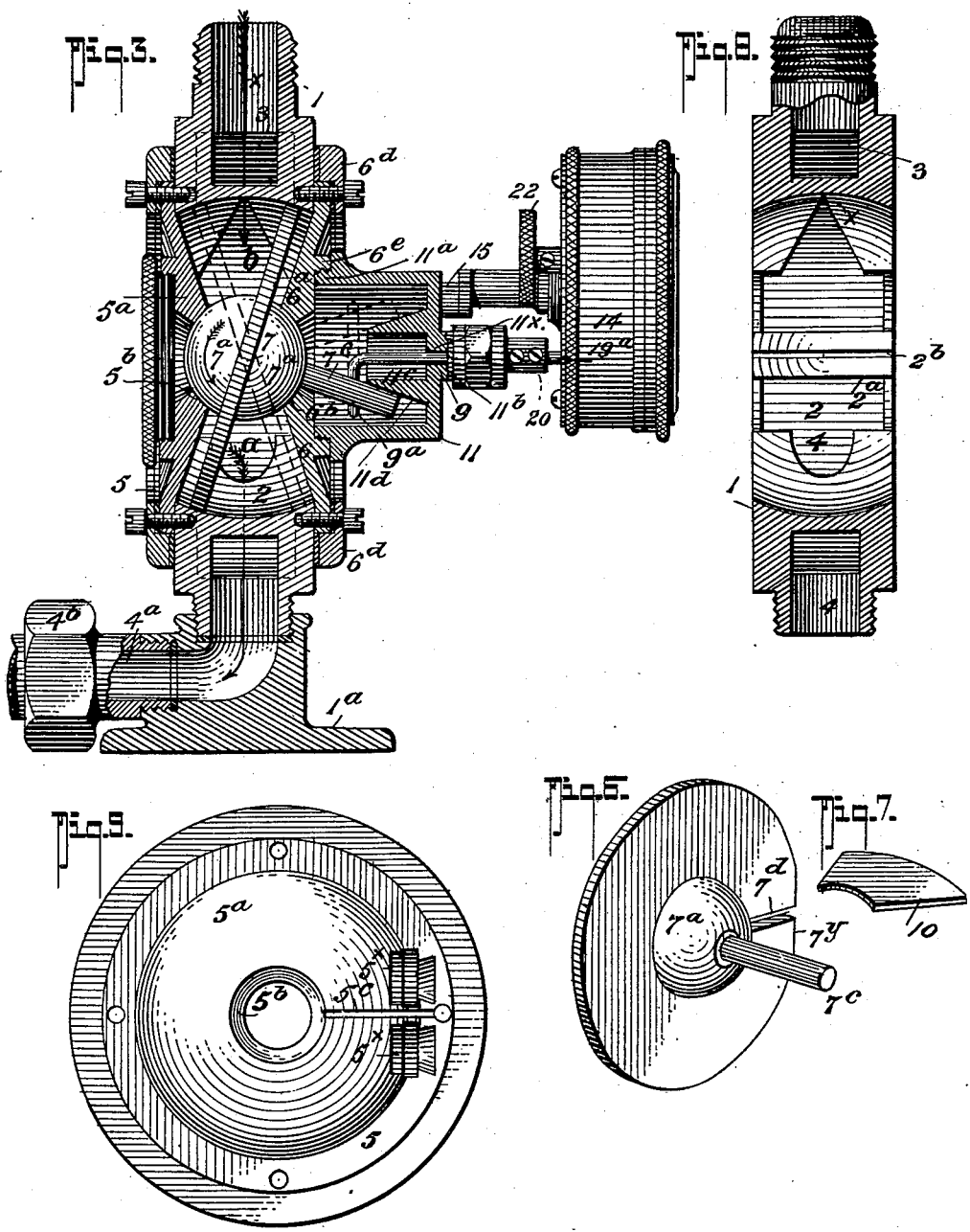

No. 676,656. Patented June 18, 1901.
A. HAAS.
LIQUID MEASURING MECHANISM.
(Application filed Jan. 14, 1901.)
(No Model.) 3 Sheets—Sheet 3.
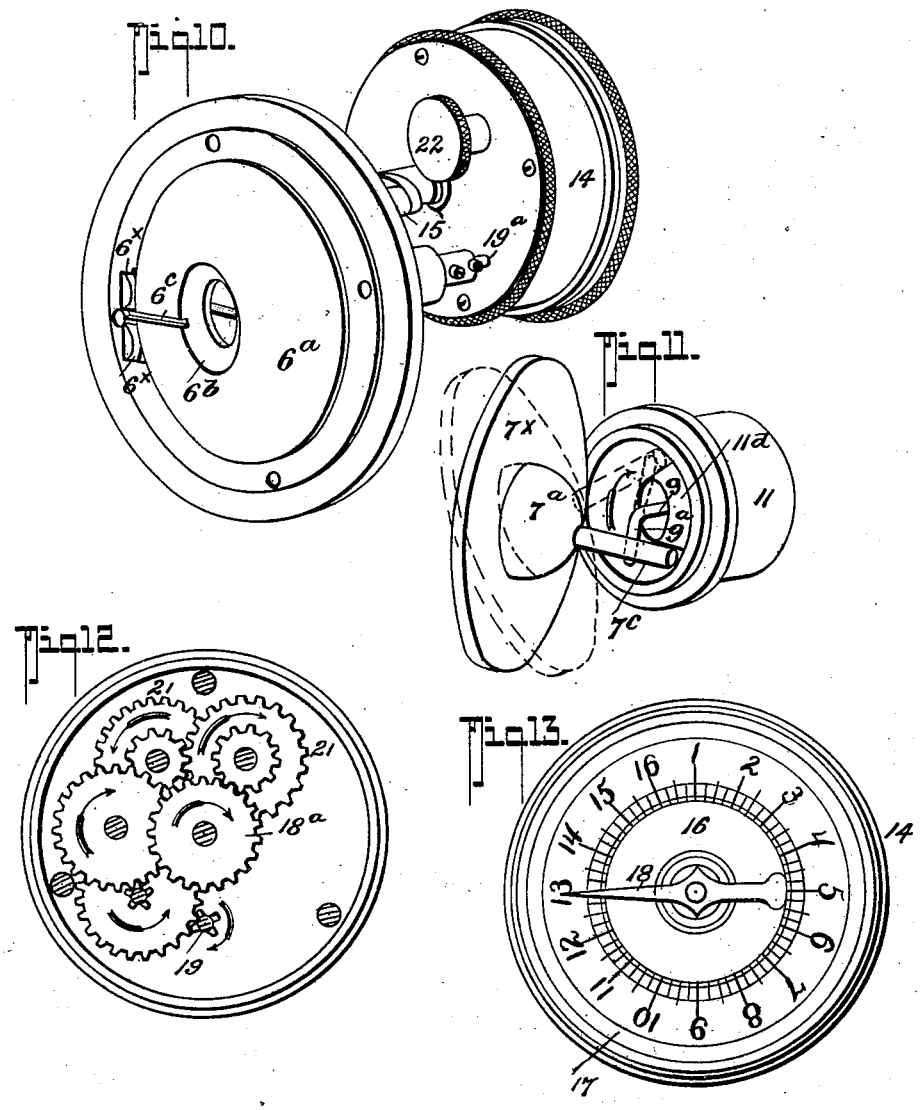
WITNESSES:
INVENTOR
Andrew Haas
BY
Fred G. Dieterich & Co.
ATTORNEYS

UNITED STATES PATENT OFFICE.

ANDREW HAAS, OF CONNELLSVILLE, PENNSYLVANIA.

LIQUID-MEASURING MECHANISM.

SPECIFICATION forming part of Letters Patent No. 676,656, dated June 18, 1901.

Application filed January 14, 1901. Serial No. 43,221. (No model.)

*To all whom it may concern:*

Be it known that I, ANDREW HAAS, residing at Connellsville, in the county of Fayette and State of Pennsylvania, have invented a new and Improved Liquid-Measuring Mechanism, of which the following is a specification.

My invention is in the nature of an improved mechanism for registering liquids that may be passed therethrough, and while my invention is adapted for measuring any easily-flowing liquid it is more particularly intended for measuring beer or other liquors held within barrels or kegs, so that the quantity sold or the quantity held within the holding vessel may be readily ascertained at a glance.

In describing and illustrating my invention I shall explain its operation particularly for registering the quantity of liquid taken from a barrel—beer, for example—and also show the same as especially arranged to connect to the outlet or faucet pipe at any point between the barrel and the faucet; but I desire it understood that the measuring mechanism forming the essential feature of my invention may be modified so as to form, as it were, a part of the faucet or spigot.

In the sale of beer or other rapidly-selling liquids it frequently is necessary, especially late of an evening or close of the business day, to know what quantity of liquor still remains in the keg, so as to determine whether it will be desirable or necessary to tap a fresh keg and also whether the quantity in the keg is sufficient to warrant drawing it off to fill in another keg or other vessel to keep it in a proper condition for use the next day, it being understood that a small quantity of beer or other malt liquor allowed to remain in a keg over night usually becomes in a condition unfit for sale.

Primarily my invention seeks to provide a fluid measuring and registering mechanism of a very simple and economical construction that can be readily applied for use and which will accurately, without any attention from the attendant, register the amount drawn off and in which the measuring or valve mechanism forming an important part of my invention will not become retarded or clogged by foam or other conditions of the liquid and continuously and accurately coact with the registering mechanism.

My invention in its generic nature comprehends a casing having an inlet and an outlet passage, a valve mechanism operating under a gyratory action, a registering mechanism supported on the casing having a main motion-transmitting gear-shaft and mechanism for transmitting a rotary action to said shaft coöperatively connected with and set under action by the gyratory or shifting action of the valve mechanism in the casing, the latter mechanism being shifted to its operative positions by a proper fluid filling of the casing upon the alternate sides thereof.

My invention also includes in its complete make-up a simplified construction of the casing, the valve, the rotary or drive shaft devices coacting with the valve and detachably connected to the casing-body proper, the registering mechanism, also detachably mounted on the casing, and a connection for joining the drive-shaft with the registering mechanism, the said several parts being relatively so constructed and combined to permit of a ready assembling of the parts and their quick separation when desired.

In its more subordinate features my invention consists in certain details of construction and peculiar combination of parts, all of which will hereinafter be fully described, and particularly pointed out in the appended claims, reference being had to the accompanying drawings, in which—

Figure 1 is a perspective view of my invention. Fig. 2 is a rear elevation of the same, the back cap-plate being removed. Fig. 3 is a vertical longitudinal section of the same, taken practically on the line 3 3 of Fig. 2, the back cap-plate being in position, the registering-casing being in side elevation. Fig. 4 is a vertical section of the valve-holding casing, taken substantially on the line 4 4 of Fig. 3 and looking in the direction of the arrow. Fig. 5 is a horizontal section on the line 5 5 of Fig. 2 looking in the direction of the arrow. Fig. 6 is a detail view of the shifting or gyratory-acting valve. Fig. 7 illustrates the shifting abutment member forming a part of the valve mechanism. Fig. 8 is a view of that part of the annular internal rim of the casing having the inlet and outlet ports with intervening recessed bridge, with which the shifting abutment member engages. Fig. 9 is an inner face view of the back cap-plate. Fig. 10 is a detail perspective view of the two-part front cap-plate with the registering-casing and registering-gear connecting devices attached. Fig. 11 is a detail perspective view illustrating the correlative positions of the valve-finger and the crank-shaft that connects with and operates the registering-gearing. Fig. 12 is a face view of one form of registering-gearing adapted to be used in connection with my improved registering means, and Fig. 13 is a face view of the dial part of said gearing.

In its practical construction my invention embodies generally a casing 1, having an internal annular chamber 2, provided at one point with an inlet 3, equipped with a union-coupling $3^a$, whereby to connect with the discharge-pipe from the barrel, keg, or other vessel from which the liquid is to be drawn, and at another point the chamber 2 has an outlet 4, discharging into an offtake-pipe $4^a$, having a suitable union-coupling $4^b$, whereby it may be conveniently connected with the faucet or other valved outlet-pipe.

In the present instance I have illustrated my invention as particularly adapted for registering the quantity of liquor (beer) drawn off from a keg, and for conveniently ascertaining the quantity of the contents of the keg the casing 1 is formed with a base-piece $1^a$, whereby it may be readily placed in position under the bar-counter or other point in close sight to the said counter.

For economy in construction and also for readily assembling the parts and for ready access to the internal mechanism a front and back cap-plate, (indicated generally by 5 and 6,) capable of being detachably secured to the casing 1, are provided, and these plates form the sides of the annular chamber 2. The wall of the annular chamber 2 is concaved in cross-section, the reason for which will presently appear, and at a point preferably at right angles to the feed or inlet pipe said wall has an inwardly-projecting fixed abutment $2^a$, that extends the full width, whose inner face is also concaved and formed with a central horizontal groove $2^b$. The inlet 3, as best shown in Fig. 4, is made <-shaped, its apex $x$ being disposed central of the wall of the annular chamber and at a point under the feed-opening $x'$, and the said inlet 3 extends divergingly toward the inwardly-extending abutment $2^a$, at which point the width of the inlet is approximately that of the compartment 2, the purpose of which will presently appear. The outlet 4 begins at a point directly under the bridge $2^a$, at which point it is approximately the width of the said bridge and extends down some distance at such width to provide for proper play of the guide-rollers forming a part of the valve devices presently described, the lower or wide end of the inlet 3 being similarly extended for the upper one of the said guide-rolls. The outlet 4 extends divergingly downwardly for a short distant to provide for a proper outflow of the liquor, as will hereinafter be more fully explained. The front and back plates are each formed with inwardly-extending conical-shaped portions $5^a$ and $6^a$, the apex or central portions of which terminate in socket-bearings $5^b$ $6^b$, that form seats for the ball portions $7^a$ $7^a$ of the automatically-operated shifting valve 7, such arrangement of parts providing, as it were, a ball-and-socket bearing for the valve 7. The valve 7 includes in its make-up a disk $7^x$, having a diameter equal to the central diameter of the chamber 2, and the said valve is made of hard rubber or other suitably-light material not easily affected by chemical action of the liquid that passes by it. At one edge the valve-disk $7^x$ is cut off to form a flat bearing edge $7^y$, adapted to ride over the concaved face of the bridge-piece $2^a$, and to facilitate the movement of the valve at its bridge-engaging end, the upper and lower parts of the edge $7^y$ each have a friction-roller 8 8, adapted to ride upon the upper and lower horizontal surfaces of the bridge-piece $2^a$, as clearly illustrated in Fig. 4, and to allow for a full sweep or shifting action of the disk $7^x$ in its opposite directions to properly cut off the liquid feed from one side of the valve to the other alternately, as will hereinafter be explained, the inner faces of cap-plates 5 and 6, that abut the opposite edges of the bridge $2^a$, have suitable recesses $5^x$ $6^x$ for the rollers 8 8 to seat in. (See Figs. 2 and 9.) At one end the valve 7 is provided with an axial extension $7^c$, that projects through the cap-plate 6 to coact with the crank member $9^a$ of the shaft 9, that imparts motion to the registering mechanism presently described in detail. At its flattened end the valve-disk $7^x$ has a radial slot $7^d$, in which seats a plate 10. This plate acts as a cut-off or division plate to break the continuity of the annular chamber 2 and is rigidly held in place by having its outer edge held in the recess of the bridge-piece $2^a$ and its side edges held in similar recesses $5^c$ $6^c$, formed in the adjacent surfaces of the cap-plates 5 and 6, the inner edge of the plate 10 being concaved to seat close up against the ball-surfaces of the disk $7^x$.

The operation of the mechanism so far described is explained as follows: Assuming the valve to be in the position shown in Fig. 3, the liquor within the chamber 2 on this side of valve 7 indicated by $a$ will be passing out through the outlet 4 to the faucet or drawing-off pipe and the liquor from feed-pipe will enter the inlet on the side indicated by $b$, which side by reason of the position of the valve 7 is now cut off from the outlet 4. The liquor filling in the side of chamber $b$ gradually by its gravity force, together with the ordinary fluid-pressure, rocks or gyrates the valve 7 to cause it to move in the direction indicated by the arrow, which movement gradually closes off the inlet to side $b$ and correspondingly moves the lower end of valve to uncover the outlet 4 to exhaust the liquor from side *b*, and as such movement of the valve continues the inlet to side *a* is opened and that side caused to fill as the side *b* exhausts, such alternate motion of the valve being regulated by reason of the manner in which the several parts of chamber 2 and valve 7 coact, their operation being regular and exact, as a certain fluid-pressure on either side of the valve alternately causes the valve to continuously shift its position. It will be readily apparent from Fig. 2 that by reason of the detachable cut-off plate 10 the liquor in entering through the inlet 3 in the direction indicated by arrow *x* will first strike the abutment-plate 10 and the bridge portion $2^a$, counter in its flow, pass back over the valve-disk 7 in the direction indicated by arrow *y* and strike against the lower face of the disk as it passes toward the exhaust. This course of the liquor tends to exert a spiral or whirling pressure on the valve-disk and impart a gyratory motion to the valve, thereby causing it to work freely and uniformly and without necessity of any other force to operate it other than the ordinary gravitation or flow of the liquor that flows against it, this being made possible and practical as the liquid on one side is constantly passing out as the other side is filling and offers no back pressure or force to hinder the accurate shifting of the valve.

Having described the manner in which the measured or predetermined quantities of the passing liquor shift the valve, I shall now describe how the valve movement is utilized for registering.

The cap member 6, which in the drawings is shown as having a supplemental ring $6^d$, that holds it clamped to the casing, is also formed with an internally-threaded hub $6^e$ to receive the threaded flange $11^a$ of a supplemental casing 11, having an outwardly-extending tubular shank $11^b$, externally threaded for a purpose presently made clear. The tubular shank $11^b$ communicates with the casing 11 through the aperture $11^x$, and surrounding the aperture $11^x$ is an inwardly-extending flange $11^c$, having a conical or diverging surface $11^d$, which forms a bearing over which the end of the shaft or axial extension of the disk $7^x$ moves during the gyratory action of the disk-valve 7, said surface $11^d$ also serving as a bearing to properly steady the valve 7 in its movements, such proper movement of the valve being also made possible by concaving the wall of the chamber 2 with which the peripheral edge of the disk 7 engages.

9 designates a short spindle or shaft journaled in the tubular shank $11^b$, one end of which projects through the conical flange $11^c$, and terminates in a crank member $10^a$, that projects in the path of movement of the axial extension of the valve-disk, as shown, the said two members being relatively so arranged and coöperate in such manner that the movement of the axial valve extension will impart a rotary motion to the shaft 9, which motion effects a proper operation of the registering mechanism connected therewith.

In the accompanying drawings I have illustrated one form of registering mechanism adapted to form a part of my complete invention. The said mechanism *per se* forms, however, no part of the invention, as any other form of registering devices, including an indicator-dial, a suitable train of gearing, and an operating-shaft extension, adapted to couple up with the crank-shaft 9, might be used.

In the construction shown the registering mechanism includes a circular casing 14, mounted on a post 15, made fast to the outer face of the casing 11 or attached thereto in any approved manner.

16 indicates the dial-face; 17, a removable glass cover therefor; 18, the dial-traversing finger, and $18^a$ the train of gearing, in which is included the main or driver gear 19, the spindle $19^a$ of which extends through the back of the casing 14 and has its end shaped to interlock with the outer end of the drive-spindle 9, any suitable coupling device being used to connect the two members $19^a$ and 13 to cause them to rotate together, a tubular sleeve 20 being shown in the drawings. If desired, supplemental gears, (indicated by 21,) having a finger-operated head 22 on the back of the casing 14, may be used to set the dial-finger by hand back to zero when so desired.

From the foregoing description, taken in connection with the accompanying drawings, it is thought the advantages and complete operation of my invention will be readily understood. By its use the amount of liquid drawn from the barrel or keg can be instantly ascertained, and by reason of the manner in which the several parts are coöperatively assembled they can be easily detached and manufactured at a cost low enough to permit of the use of the complete device for drawing of quick-flowing liquors of any kind from their holding vessel and at the same time accurately measure the quantity drawn off.

Changes in the details of construction and modifications thereof may be made without departing from the scope of the appended claims.

Having thus described my invention, what I claim, and desire to secure by Letters Patent, is—

1. In a liquid-measuring apparatus, a casing having an annular chamber provided with an inlet and with an outlet, a bridge or abutment in the casing separating the inlet and outlet, and having a concaved face, a gyratory valve-disk having a ball-and-socket bearing within the casing, and provided with an axial projection and having a radial slot, and a flat face into which said slot opens, a cut-off plate entering said slot and the inner end thereof being concaved to fit against the ball of said bearing, the outer end of said plate being fitted in a recess in the bridge or abutment, and studs supported by the disk and projecting from its flat face and carrying rollers adapted to travel upon the upper and lower surfaces of said abutment.

2. In a liquid-measuring apparatus, a casing having an annular chamber provided with an inlet and with an outlet, a bridge or abutment in the casing separating the inlet and outlet and having a concaved face, a gyratory valve-disk having a ball-and-socket bearing within the casing, and provided with an axial projection and having a radial slot and a flat face into which said slot opens, a cut-off plate entering said slot and the inner end thereof being concaved to fit against the ball of said bearing, the outer end of said plate being fitted in a recess in the bridge or abutment, studs supported by the disk and projecting from its flat face and carrying rollers adapted to travel upon the upper and lower surfaces of said abutment, a cap detachably connected to the casing having an internal hub provided with a conical bearing-surface along which the axial projection is adapted to travel, a shaft projecting into said cap, having a crank-arm disposed in the path of said radial projection, and register mechanism operable by said shaft.

3. A liquid measuring and registering apparatus, comprising a casing, circular plates detachably fitted to opposite sides of the casing, having conical surfaces, and central spherical sockets, and rings detachably secured to the opposite sides of the casing, having annular grooves to receive the circular plates.

4. A liquid measuring and registering apparatus, comprising a casing, circular plates detachably fitted to opposite sides of the casing, having conical surfaces and central spherical sockets, rings detachably secured to the opposite sides of the casing, having annular grooves to receive the circular plates, and a cap detachably fitted to one of said plates and having an internal conical bearing-surface.

5. A liquid measuring and registering apparatus, comprising a casing, circular plates detachably fitted to opposite sides of the casing, rings having annular seats to receive the peripheries of the plates, and a cap screw-threaded into one of the plates having an internal hub, and the external surface of said hub being conical and the inner surface of the cap being cylindrical.

6. A liquid measuring and registering apparatus, comprising a casing, circular plates detachably fitted to opposite sides of the casing, rings having annular seats to receive the peripheries of the plates, a cap screw-threaded into one of the plates having an internal hub, and the external surface of said hub being conical and the inner surface of the cap being cylindrical, a gyratory disk in the casing having an axial projection to travel upon the conical surface of the cap, a spindle extending through the hub, having a crank to be engaged by said axial projection, and register mechanism, operable by said spindle.

ANDREW HAAS.

Witnesses:
CHRISTIAN YAGGIS,
JAMES ECHARD.